United States Patent
Tudor

(10) Patent No.: US 6,920,634 B1
(45) Date of Patent: Jul. 19, 2005

(54) DETECTING AND CAUSING UNSAFE LATENT ACCESSES TO A RESOURCE IN MULTI-THREADED PROGRAMS

(75) Inventor: Curt D. Tudor, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/128,394

(22) Filed: Aug. 3, 1998

(51) Int. Cl.$^7$ ................................. G06F 9/00
(52) U.S. Cl. .................... 718/107; 711/141; 711/168; 717/124
(58) Field of Search ................. 718/107, 108; 711/141, 168, 152; 717/124; 709/107, 108; 707/8

(56) References Cited

U.S. PATENT DOCUMENTS

| | | | | |
|---|---|---|---|---|
| 5,630,128 A | * | 5/1997 | Farrell et al. | 709/103 |
| 5,632,032 A | * | 5/1997 | Ault et al. | 709/100 |
| 5,784,618 A | * | 7/1998 | Toutonghi | 709/107 |
| 5,842,016 A | * | 11/1998 | Toutonghi et al. | 709/106 |
| 5,940,827 A | * | 8/1999 | Hapner et al. | 707/8 |
| 6,009,269 A | * | 12/1999 | Burrows et al. | 717/130 |
| 6,026,427 A | * | 2/2000 | Nishihara et al. | 709/106 |
| 6,360,303 B1 | * | 3/2002 | Wisler et al. | 711/152 |
| 6,434,590 B1 | * | 8/2002 | Blelloch et al. | 718/102 |

OTHER PUBLICATIONS

Savage et al., "Eraser: A Dynamic Data Race Detector for Multi-Threaded Programs".

* cited by examiner

Primary Examiner—Thomas Lee
Assistant Examiner—Li Zhen

(57) ABSTRACT

Methods and systems for analyzing multi-threaded programs are provided. The predisposed execution of multi-threaded programs is modified to cause and detect latent unsafe accesses to a resource, such as a memory location. It is first determined that unsynchronized accesses to a resource of interest are possible. When a thread requests to access the resource, the thread is suspended. A subsequent thread that accesses the resource awakens the suspended thread, thereby causing unsynchronized accesses to the resource that may produce unpredictable results. The unsynchronized accesses can be logged for viewing by a user.

30 Claims, 14 Drawing Sheets

DETECTING AND CAUSING UNSAFE LATENT ACCESSES TO A RESOURCE IN MULTI-THREADED PROGRAMS

BACKGROUND OF THE INVENTION

The present invention relates to analyzing multi-thread programs. More specifically, the invention relates to modifying the predisposed execution of a multi-threaded program to detect and cause latent unsafe accesses to a resource, such as a memory location.

Traditional computer programs involved a single execution stream that performed operations sequentially. However, it is now common for computer programs to include multiple execution streams, which can perform operations in parallel. Each instruction stream is known as a "thread".

Multi-threaded programs allow for better utilization of the computer system's resources. For example, where a traditional single-threaded program awaits for user input and wastes processing power, a multi-thread program can have a thread perform operations in the "background" while a different thread is processing the user input. Thus, a multi-threaded word processing program can perform spell checking or a multi-threaded spreadsheet program can recalculate the spreadsheet in the background to achieve more efficient utilization of processing power.

Although multi-threaded programs can provide better utilization of the computer system's resources, the dynamic execution of threads makes debugging the programs very difficult. Errors in thread synchronization may be rarely manifested during program execution. This can make the synchronization errors hard to detect, hard to reproduce and hard to verify that an error has been corrected.

In order to detect synchronization errors, it is desirable to determine which resources do not have their access synchronized with synchronization objects, such as a lock. FIG. 1 shows a resource, here a memory location "v," that is synchronized by a lock "mu." Before thread 1 writes a value to memory location v, the thread acquires lock mu at an instruction 1. If lock mu is unavailable, the thread will wait, usually suspended, until the lock becomes available.

After thread 1 acquires lock mu, thread 1 writes a value to memory location (i.e., increments v) at an instruction 3. Thread 1 then releases lock mu at an instruction 5 because thread 1 has finished accessing the memory location.

Thread 2 subsequently desires to write data to memory location v. In a manner similar to thread 1, thread 2 acquires lock mu at an instruction 7. Once the lock is acquired, thread 2 writes data to memory location v at an instruction 9 and releases the lock at an instruction 11.

FIG. 1 is a simple illustrating of how accesses to a resource, such as a memory location, may be synchronized using synchronization objects. With this simple example in mind that utilizes a single lock, it may seem easy to determine which accesses to resources have the potential to generate synchronization errors. However, multi-threaded programs are all too often not so simple.

Multi-threaded programs can be constantly acquiring, holding and releasing any number of synchronization objects. Therefore, it can be difficult to determine if access to a resource is or is not managed using synchronization objects. In "Eraser: A Dynamic Data Race Detector for Multi-Threaded Programs," by Stefan Savage, which is hereby incorporated by reference, techniques for detecting potential synchronization errors or data races are described.

A candidate set C(v) of locks is maintained for each memory location of interest. The candidate set is the intersection of the sets of locks that each thread that accessed a memory location held at the time of access. When a candidate set becomes empty, a potential synchronization error has been detected because no synchronization object controls access to the memory location.

As an example, FIG. 2 shows a method of detecting a potential synchronization error through lock set refinement. There are three columns where the first designated "Program" includes instructions of a computer program, the second designated "locks_held" includes the locks currently held by the execution stream, and the third designated "C(v)" includes the locks that make up the candidate set. Before the first instruction shown in executed, the locks_held is the empty set and the candidate set includes all the possible locks, which is "mu1" and "mu2." Thus, the execution stream holds no locks and there are two locks that can utilized to synchronize access to the memory location of interest "v."

At an instruction 101, the execution stream acquires lock mu1. Once the lock is acquired as indicated by the locks_held including the lock mu1, the execution stream writes data to the memory location v at an instruction 103. Since lock mu1 was held when the memory location v was accessed, the candidate set C(v) is set equal to the intersection of the locks_held and the current candidate set. In other words, the intersection of locks_held {mu1} and candidate set {mu1, mu2} is calculated, which {mu1}, so the candidate set becomes {mu1} as indicated in FIG. 2. Lock mu1 is released at an instruction 105 and the locks_held becomes the empty set.

The extension stream acquires lock mu2 at an instruction 107, which makes the locks_held include mu2. At an instruction 109, the memory location v is written to so the candidate set is set equal to the intersection of the locks_held and the candidate set. The intersection of locks_held {mu2} and calculate set {mu1} is the empty set. Thus, the candidate set becomes the empty set as shown. Lock mu2 is released at an instruction 111 and the locks_held becomes the empty set. It should be understood that although the instructions 101–111 were described as being in the same execution stream for simplicity, a multi-threaded program may have performed instructions 101–105 in a first thread and instructions 107–111 in a second thread.

Once the candidate set becomes the empty set, there is a potential synchronization error since there is no lock that restricts access to the memory location of interest. Although the identification of potential synchronization errors is beneficial, there is a need for methods and systems of manipulating multi-threaded programs so that latent synchronization errors will manifest themselves.

SUMMARY OF THE INVENTION

Embodiments of the present invention provide methods and systems for analyzing multi-threaded programs. More specifically, the predisposed execution of multi-threaded programs is modified to cause and detect latent unsafe accesses to a resource, such as a memory location. It is first determined that unsynchronized accesses to a resource of interest are possible. When a thread requests to access the resource, the thread is suspended. A subsequent thread that accesses the resource awakens the suspended thread, thereby causing synchronized accesses to the resource that may produce unpredictable results. The unsynchronized accesses can be logged for viewing by a user. Several embodiments of the invention are described below.

In one embodiment, the invention provides a method of analyzing multi-threaded programs. It is determined that unsynchronized accesses to a resource of interest can be performed by a plurality of threads. A request from a first thread to access the resource is received and the first thread is suspended. While the first thread is suspended, a request from a second thread to access the resource is received. The resource can be a memory location, region of memory, hardware component, peripheral device, and the like.

In another embodiment, the invention provides a method of analyzing multi-threaded programs. It is determined that unsynchronized accesses to a memory location can be performed by a plurality of threads. A request from a first thread to write data to the memory location is received and the first thread is suspended. While the first thread is suspended, a request from a second thread to write data to the memory location is received. The first thread can be suspended for a predetermined time and/or on an event.

In another embodiment, the invention provides a method of analyzing multi-threaded programs. It is determined that unsynchronized accesses to a memory location can be performed by a plurality of threads. A request from a first thread to write data to the memory location is received and the first thread is suspended. The first thread is awakened and it is logged for a user that the first and second thread performed unsynchronized writes to the memory location.

In another embodiment, the invention provides a method of analyzing multi-threaded programs. An existing multi-threaded program is modified to include computer code that determines that unsynchronized accesses to a memory location can be performed by a plurality of threads. The existing multi-threaded program is modified to include computer code that suspends a first thread that writes data to a memory location and computer code that logs for a user that the first and second thread performed unsynchronized writes to the memory location when a second thread writes data to the memory location.

Other features and advantages of the invention will become readily apparent upon review of the following description in association with the accompanying drawings.

DETAILED DESCRIPTION OF PREFERRED EMBODIMENTS

In the description that follows, the present invention will be described in reference to embodiments that analyze multi-threaded programs in order to detect latent unsafe accesses to a resource. More specifically, the embodiments will be described in reference to modifying an existing multi-threaded program to perform the analysis. However, the invention is not limited to any particular language, computer architecture or specific implementation. Therefore, the description of the embodiments that follows is for purposes of illustration and not limitation.

Figures 1, 2:
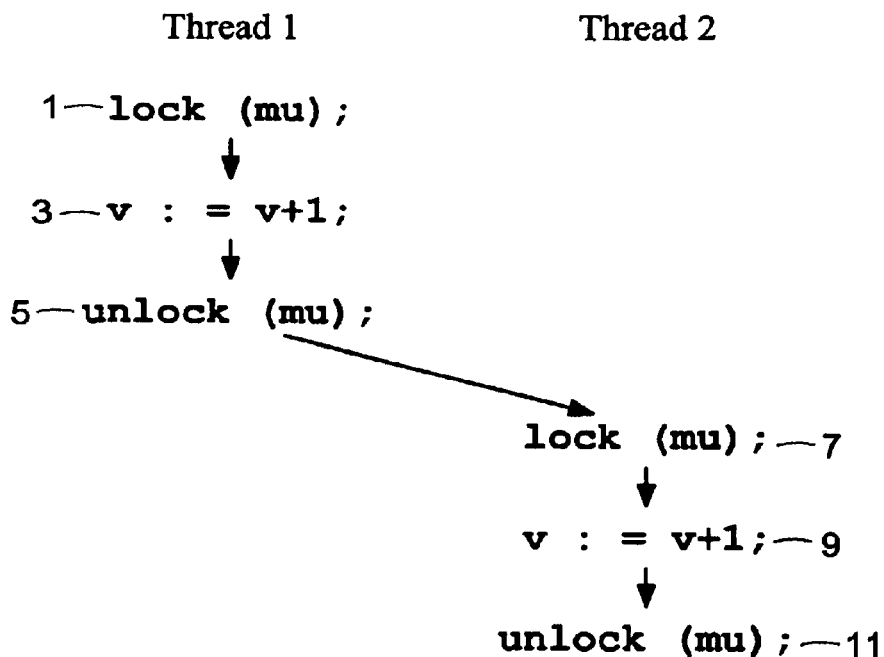
FIG. 1 illustrates how accesses to a resource, such as a memory location, may be synchronized using synchronization objects.
FIG. 2 shows a method of detecting a potential synchronization error through lock set refinement.
Figure 3:
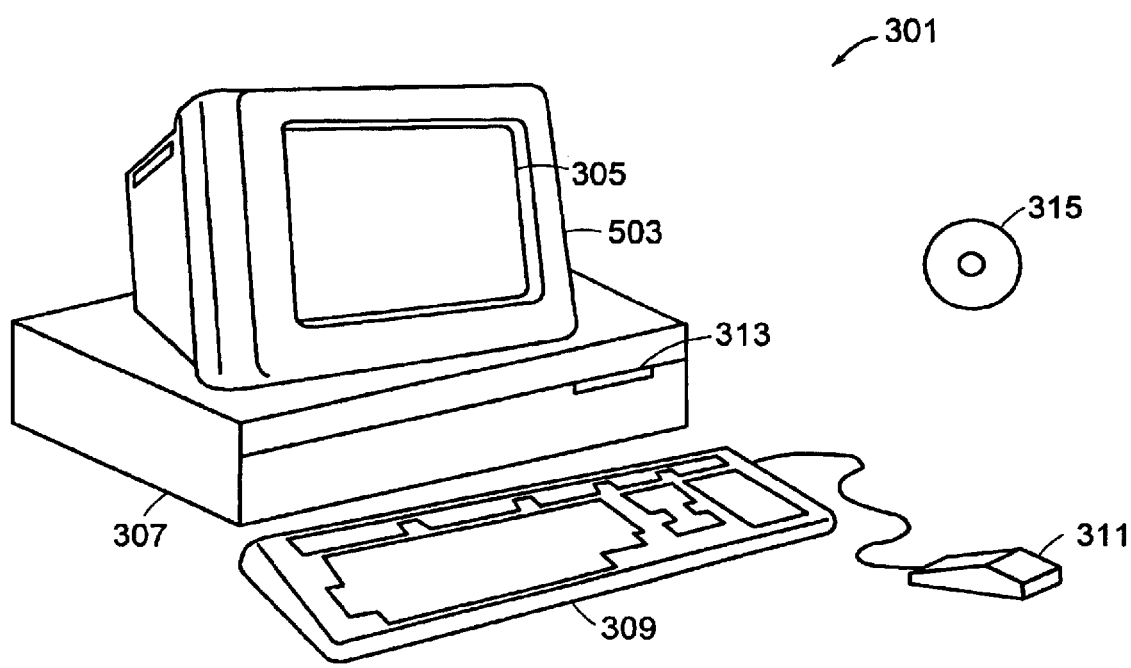
FIG. 3 illustrates an example of a computer system that can be utilized to execute the software of an embodiment of the invention.

FIG. 3 illustrates an example of a computer system that can be used to execute the software of an embodiment of the invention. FIG. 3 shows a computer system 301 that includes a display 303, screen 305, cabinet 307, keyboard 309, and mouse 311. Mouse 311 can have one or more buttons for interacting with a graphical user interface. Cabinet 307 houses a CD-ROM drive 313, system memory and a hard drive (see FIG. 4) which can be utilized to store and retrieve software programs incorporating computer code that implements the invention, data for use with the invention, and the like. Although CD-ROM 315 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 4:
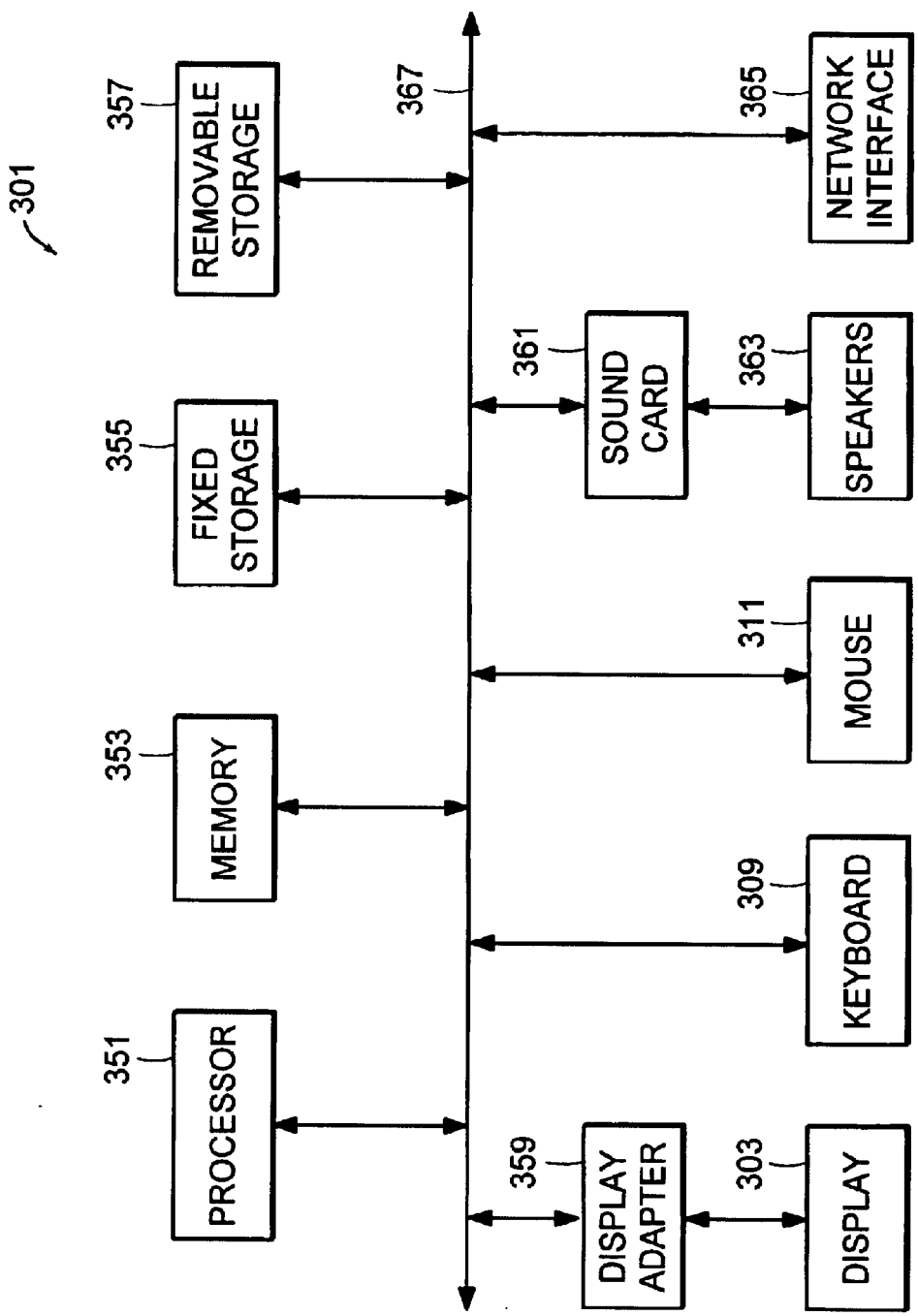
FIG. 4 illustrates a system block diagram of the computer system of FIG. 3.

FIG. 4 shows a system block diagram of computer system 301 used to execute the software of an embodiment of the invention. As in FIG. 3, computer system 301 includes monitor 303 and keyboard 309, and mouse 311. Computer system 301 further includes subsystems such as a central processor 351, system memory 353, fixed storage 355 (e.g., hard drive), removable storage 57 (e.g., CD-ROM drive), display adapter 359, sound card 361, speakers 363, and network interface 365. Other computer systems suitable for use with the invention can include additional or fewer subsystems. For example, another computer system could include more than one processor 351 (i.e., a multi-processor system) or a cache memory.

The system bus architecture of computer system 301 is represented by arrows 367. However, these arrows are illustrative of any interconnection scheme serving to link the subsystems. For example, a local bus could be utilized to connect the central processor to the system memory and display adapter. Computer system 301 shown in FIG. 4 is but an example of a computer system suitable for use with the invention. Other computer architectures having different configurations of subsystems can also be utilized.

Multi-threaded programs, just like single-threaded programs, are typically produced by linking object files to produce executable computer code. The object files can be produced by compiling high level source code (e.g., the C++ programming language) or low level source code (e.g., assembly). Additionally, multi-threaded programs can call object code functions stored as dynamic link libraries ("DLLs").

In order to analyze the execution of a multi-threaded program, preferred embodiments of the invention insert additional instructions in the object code of the program. Various techniques of object code insertion ("OCI") can be utilized with the invention including the techniques described in U.S. Pat. No. 5,193,180, issued Mar. 9, 1993, which is hereby incorporated by reference.

Utilizing OCI has a number of advantages. Since the object code is manipulated, it is not necessary to have access to the source code of a program. This can be especially advantageous for programs that utilize commercial libraries where the source code is generally unavailable. Additionally, OCI allows the analysis to be performed on any program regardless of the language that was used to develop the program. Although preferred embodiments utilize OCI, the invention is not limited to OCI and can be utilized where source code is modified and then compiled/assembled or in interpreted environments.

Figure 5A:
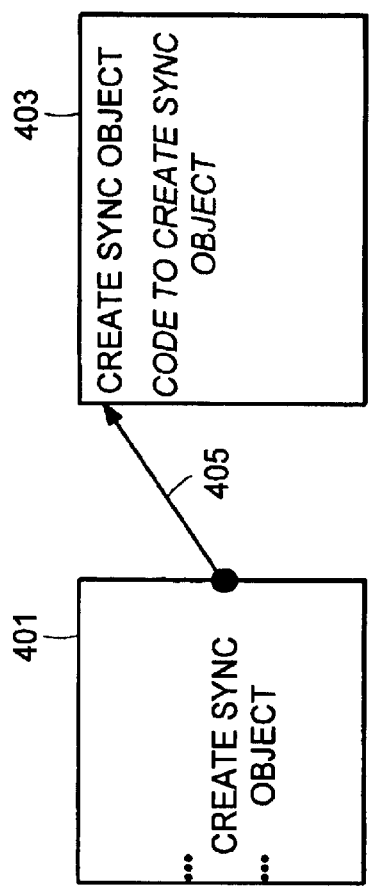
FIG. 5A shows a call to create a synchronization object and FIG. 5B shows how the call can be wrapped.

Before getting to the specifics of the invention, it may be beneficial to describe a technique known as "wrapping" a function. Wrapping a function allows the program flow to be intercepted so that additional and/or alternative instructions can be executed. As an example, FIG. 5A shows a call to create a synchronization object. An object code file 401 includes a call to a function that creates a synchronization object ("create sync object"), such as a lock. An object code file 403 includes the function that creates the synchronization object (or "sync object" for short).

In normal program flow, the computer system executes the instructions in object file 410 until the call to the function that creates a synchronization object is reached. The call typically causes the computer system to save the state of the machine and begin executing the instructions of the call function in object code file 403. The call is indicated by an arrow 405.

After the function that creates the synchronization object finishes execution, the state of the machine before the call is restored and execution resumes in object code file 401 after the function call. Although the function call and function have been described in terms of object code files, the executable code is typically in the form of an executable file. The mechanics of calling functions is well known in the art and is provided to show a reference for wrapping functions.

Figure 5B:
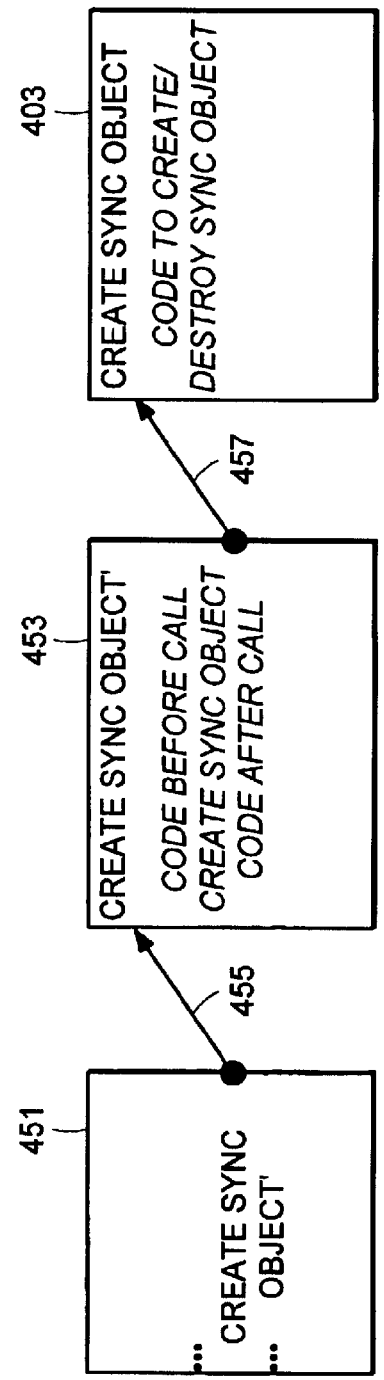

FIG. 5B shows how the call of FIG. 5A can be wrapped or intercepted. The function call to create a synchronization object in object code 401 ("create sync object") is modified in an object code file 451. Unless otherwise described, object code 451 includes the same instructions as object code 401. The different function call ("create sync object") in object code file 451 calls a function in an object code file 453 as indicated by an arrow 455.

The new function that creates a synchronization object in object code file 453 typically calls the function in object code 403 as indicated by an arrow 457. However, the function in object code file 453 can include instructions before and after the function call. In this manner, the function in object code file 403 can be wrapped with instructions that are executed before and/or after the function executes. Wrapping is also described in U.S. Pat. No. 5,193,180, which has been incorporated by reference.

An embodiment of the invention maintains a list of all the synchronization objects that are available during program execution. In order to maintain the list, the functions that create, destroy and manipulate synchronization objects are wrapped so that list can be maintained. Other lists of information may also be maintained but first an embodiment will be described that logs unsynchronized accesses to a resource.

Figure 6:
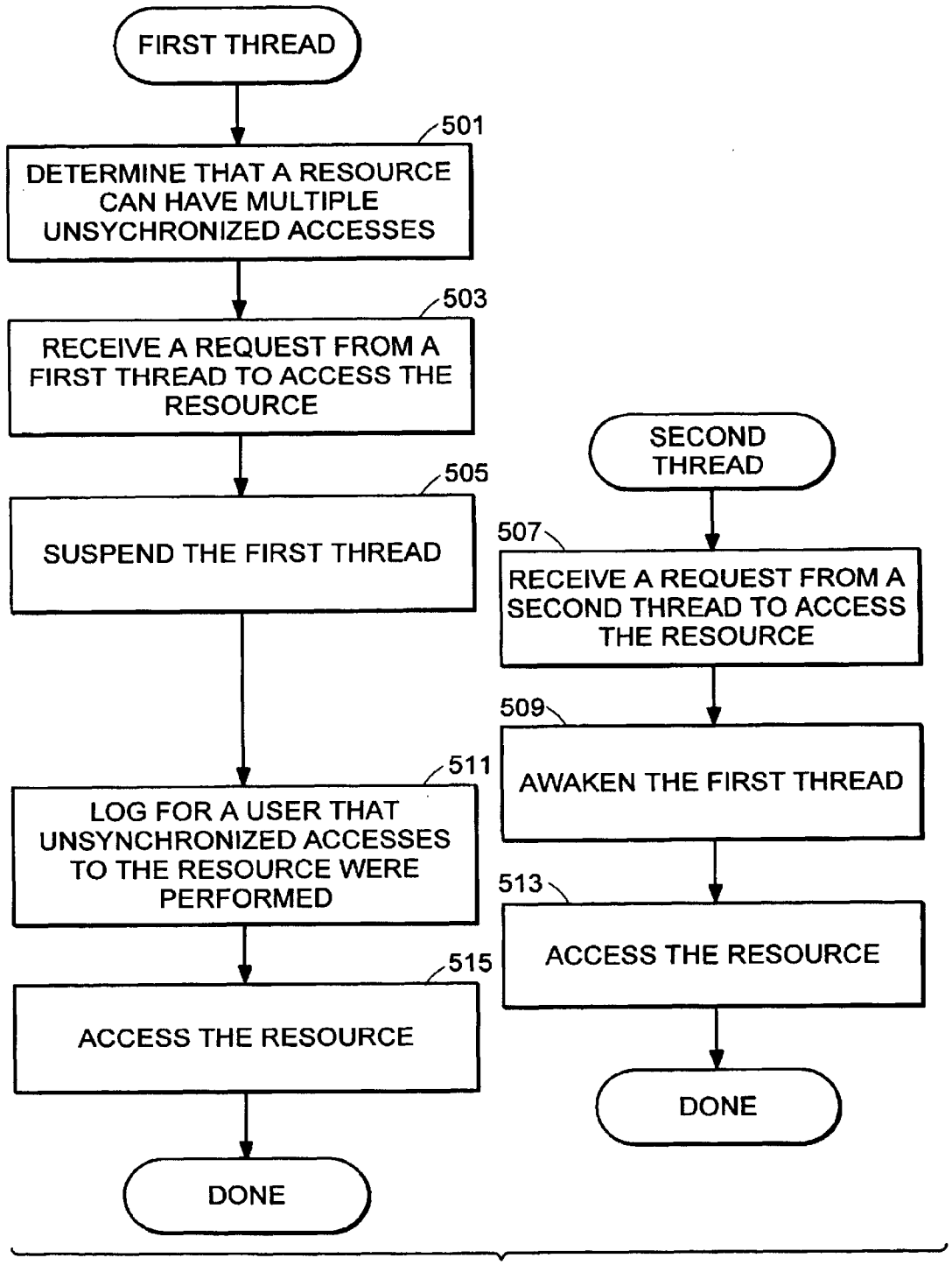
FIG. 6 shows a process of the invention that logs unsynchronized accesses to a resource by more than one thread.

FIG. 6 shows a process of the invention that logs unsynchronized accesses to a resource by more than one thread. The execution flow of two threads denoted first and second threads are shown. At a step 501, the first thread determines that a resource can have multiple unsynchronized accesses. It is not necessary that the first thread make this determination as any thread could have determined that unsynchronized accesses are possible.

Unsynchronized accesses occur when more than one thread can access a resource and there is no mechanism for synchronizing the accesses (i.e., preventing simultaneous accesses). Some unsynchronized accesses can be acceptable depending on the application. For example, a memory location that is only read by multiple threads may not be problematic.

However, if one of the unsynchronized accesses to a memory location is a write, the program's execution can vary depending on the timing of the write and reads. If more than one of the unsynchronized accesses is a write, a write can be lost if it is followed by another write. A "race condition" will be used herein to define unsynchronization accesses to a resource where at least one of the accesses writes data. Embodiments of the invention can be utilized to detect unsynchronized accesses to resources and, more specifically, race conditions.

Once it is determined that a resource can have multiple unsynchronized accesses, a request is received from the first thread to access the resource at a step 503. The access to the resource is typically intercepted using the OCI and wrapping techniques described above. At a step 505, the first thread is suspended.

At a step 507, a request is received from a second thread to access the resource, which is known to be susceptible to multiple unsynchronized accesses. At this point, the second thread determines that the first thread has been suspended for accessing the resource so the first thread is awakened at a step 509.

Upon awakening, the first thread logs for a user that unsynchronized accesses to the resource were performed at a step 511. The second and first threads are then free to access the resource, potentially simultaneously, at steps 513 and 515, respectively. The first thread performs the log in FIG. 6 but the second thread could also log the unsynchronized access if desired. Although FIG. 6 only shows two threads, a third (and fourth, etc.) thread could also request to access the resource and attempt to wake up the first thread. Upon awakening the first thread can collect the awakening messages, possibly waiting a predetermined amount of time, to determine how many threads performed unsynchronized accesses to the resource.

The resources that can be monitored by the invention include memory locations, regions of memory, hardware components, peripheral devices, and the like. The following will describe a preferred embodiment that detects race conditions at memory locations of interest.

Figure 7A:
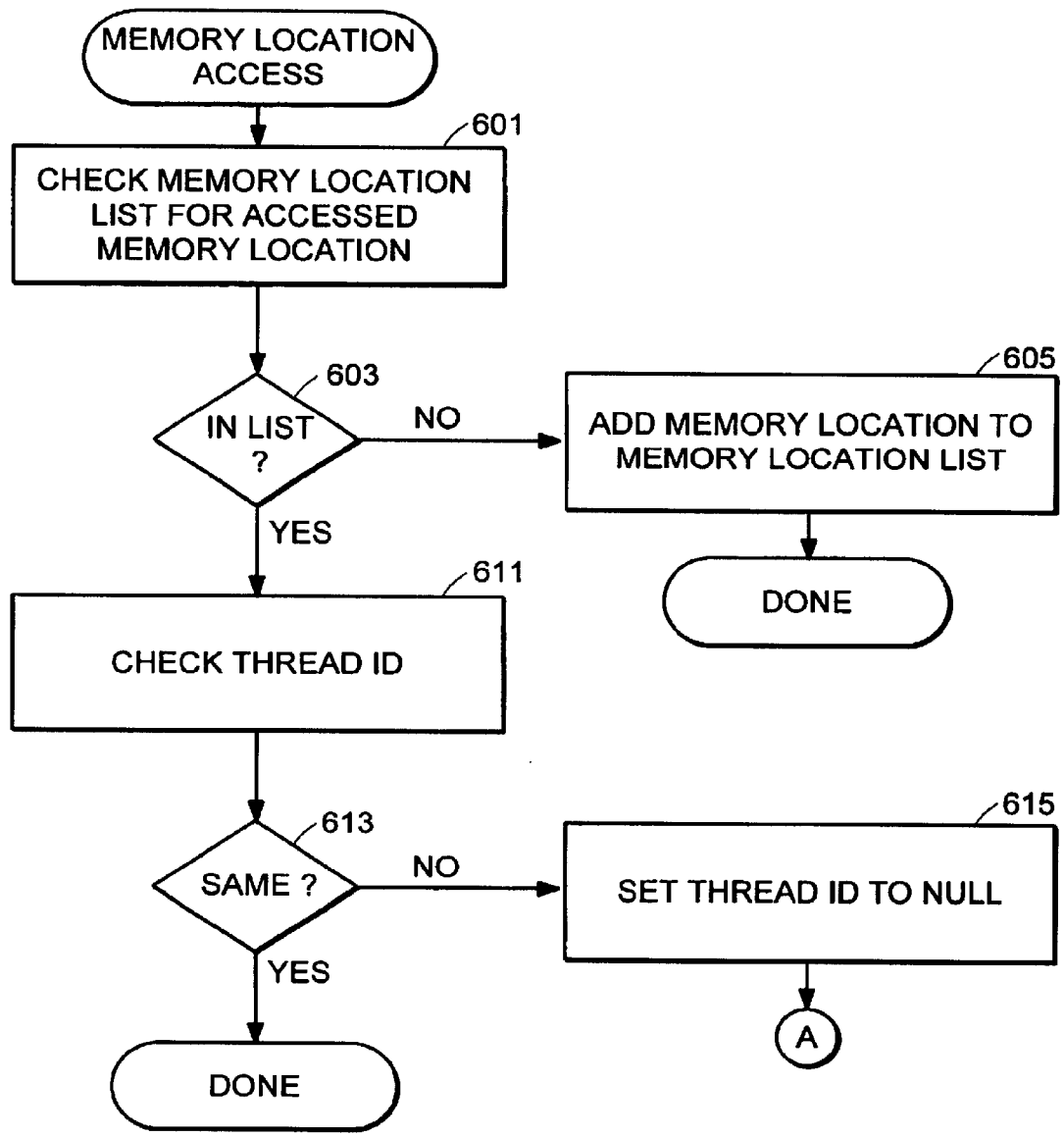
FIGS. 7A–7F show a flowchart of a process of detecting and logging unsynchronized accesses to a memory location.

FIGS. 7A–7F show a flowchart of a process of detecting and logging unsynchronized accesses, more specifically race conditions, to a memory location. FIG. 7A begins after a thread has requested access to a memory location. At a step 601, a memory location list is accessed to see if the memory location is in the list. The memory location list is a list of memory locations that are to be monitored for unsynchronized accesses. The memory list can include all memory locations accessible by the multi-threaded program or only selected memory locations of interest.

As an example, the user may select the memory locations to monitor. However, the embodiment described in reference to FIG. 7A monitors all the possible memory locations. The structure of the memory location list and all lists utilized with the invention can be any suitable data structure including a linked list, a hash table, an array, or the like.

If the memory location is determined not to be in the memory location list at a step 603, the memory location is added to the memory location list at a step 605. A process of adding a memory location to the list will now be described in more detail in reference to FIG. 8.

Figure 8:
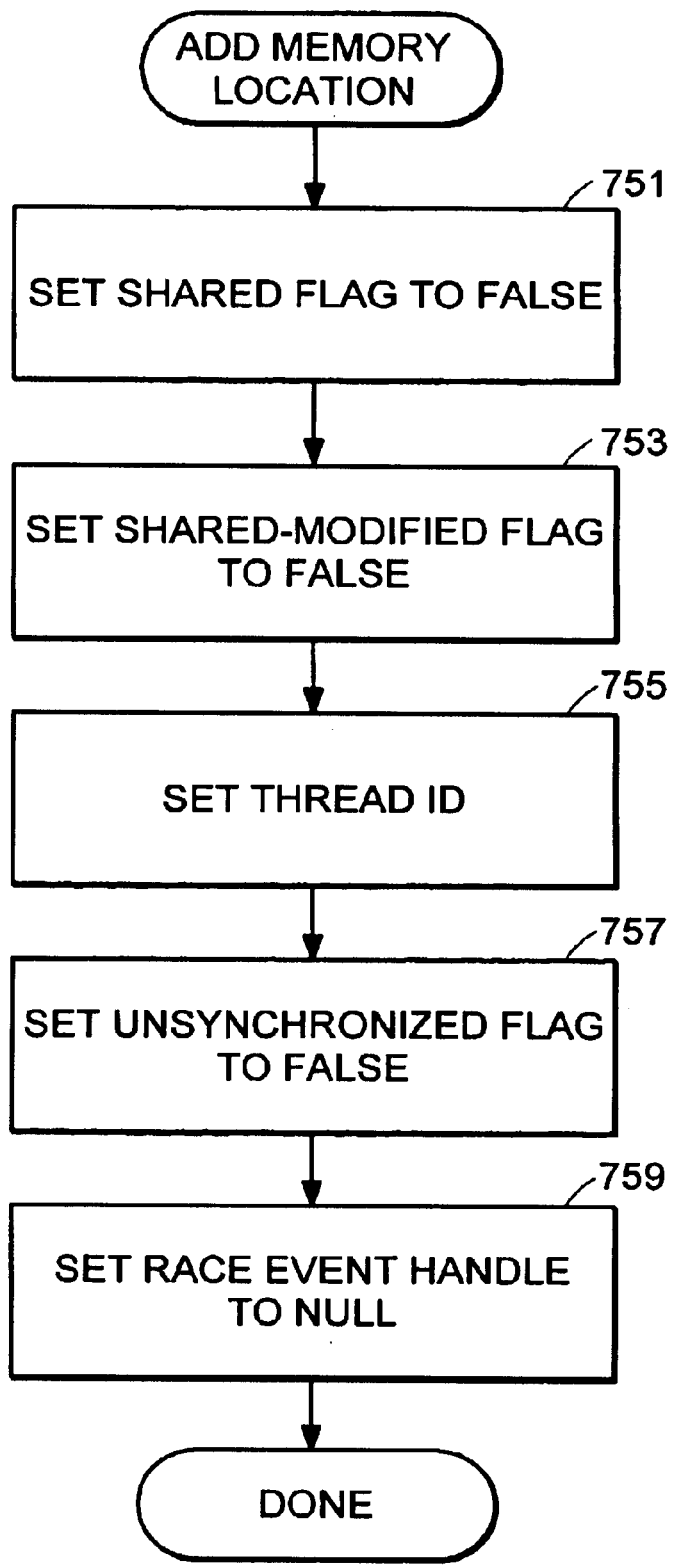
FIG. 8 shows a flowchart of a process of adding a memory location that will have its access monitored.

FIG. 8 shows a flowchart of a process of adding a memory location to the memory location list to its access monitored. The memory location list includes an element for each memory location that is to be monitored. Each element includes the following variables:

Shared flag—indicates if more than one thread has accessed the memory location

Shared-modified flag—indicates if more than one thread has accessed the memory location and one of the thread performed a write Thread ID—holds the identifier ("ID") of the thread that has exclusive access to the memory location, otherwise it is "null"

Sync object set—set of locks held by all threads that accessed the memory location Unsynchronized flag—indicates if the memory location has been determined to be accessible by unsynchronized accesses Race event handle—handle of the event that will awaken a suspended thread that performed an unsynchronized wire The flowchart of FIG. 8 initializes these variables.

At a step 751, the shared flag is set to "false" meaning that more than one thread has not accessed the memory location. This is known to be false at this time since only one thread has accessed the memory location at this point in time. The shared-modified flag is set to "false" at a step 753. Setting the shared-modified flag to false indicates that more than one thread has not accessed the memory location with one of the threads performing a write. The shared and shared-modified flags are not mutually exclusive (e.g., both flags can be set to "true"). In a preferred embodiment, the flags are implements as bits that are toggled but the flags can be implemented in other ways known in the art.

The thread ID of the memory location element is set equal to the ID of the current thread at a step 755. The thread ID is typically assigned by the operating system. The thread ID will subsequently be set to "null" if more than one thread has accessed the memory location.

The unsynchronized flag of the memory location element is set to "false" at a step 757. The unsynchronized flag indicates if unsynchronized accesses to the memory location are possible. In the embodiment being described, the unsynchronized flag will be set to "true" when race conditions are possible, meaning that there is more than one unsynchronized access and at a least one of the accesses is a write.

At a step 759, the race event handle of the memory location element is set to "null." This variable will be utilized once a thread has been suspended that attempted to write to a memory location that can be accesses with unsynchronized accesses. Since this is the first time that the memory location has been accessed, no other processing may be required so the thread can be allowed to continue.

Returning again to FIG. 7A, if the memory location is in the memory location list, the thread ID in the memory location element is checked at a step 611. If the thread ID in the memory location element and the current thread ID are determined to be the same at a step 613, the processing of the thread continues since the same thread that has been the only thread to access to the memory location has accessed memory location again.

Otherwise, the thread ID is not the same meaning that is the second or subsequent thread that has accessed this memory location. At a step 615, the thread ID of the memory location element is set to "null," which should be an invalid ID for a thread. In this manner, the thread ID indicates the ID of a single thread that has been the only thread to access the memory location or a "null" value to indicate that more than one thread has accessed the memory location. A process that may be utilized to handle when more than one thread accesses a memory location will be described in more detail in reference to FIGS. 7B–7F.

Figure 7B:
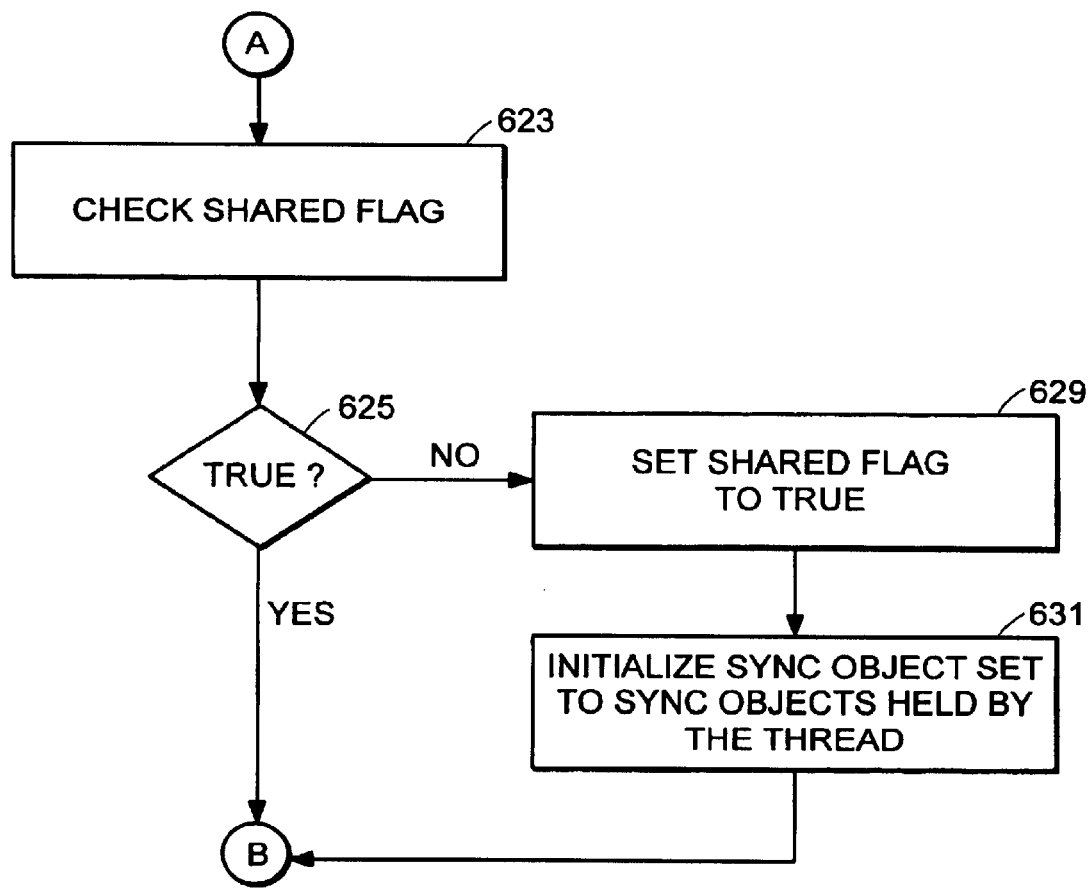

In FIG. 7B, the shared flag of the memory location element is checked at a step 623. If the shared flag is "false" at a step 625 then this is the second thread to access the memory location and the sync object set of the memory location element should be initialized. At a step 629, the shared flag of the memory location element is set to "true." The sync object set of the memory location element is set (or initialized) to include the sync objects held by the current thread at a step 631. The sync object set can be thought of as a set of possible sync objects (or candidate list) that could be being utilized to synchronize access to the memory location. At this time, unless the set of sync objects being held by the thread is the empty set, it is generally unclear if a sync object is being utilized to synchronize access to the memory location. Lock set refinement is utilize to determine if unsynchronized accesses are possible. However, in short, when the sync object set becomes (or is initialized to be) the empty set, unsynchronized accesses to the memory location as possible.

Figure 7C:
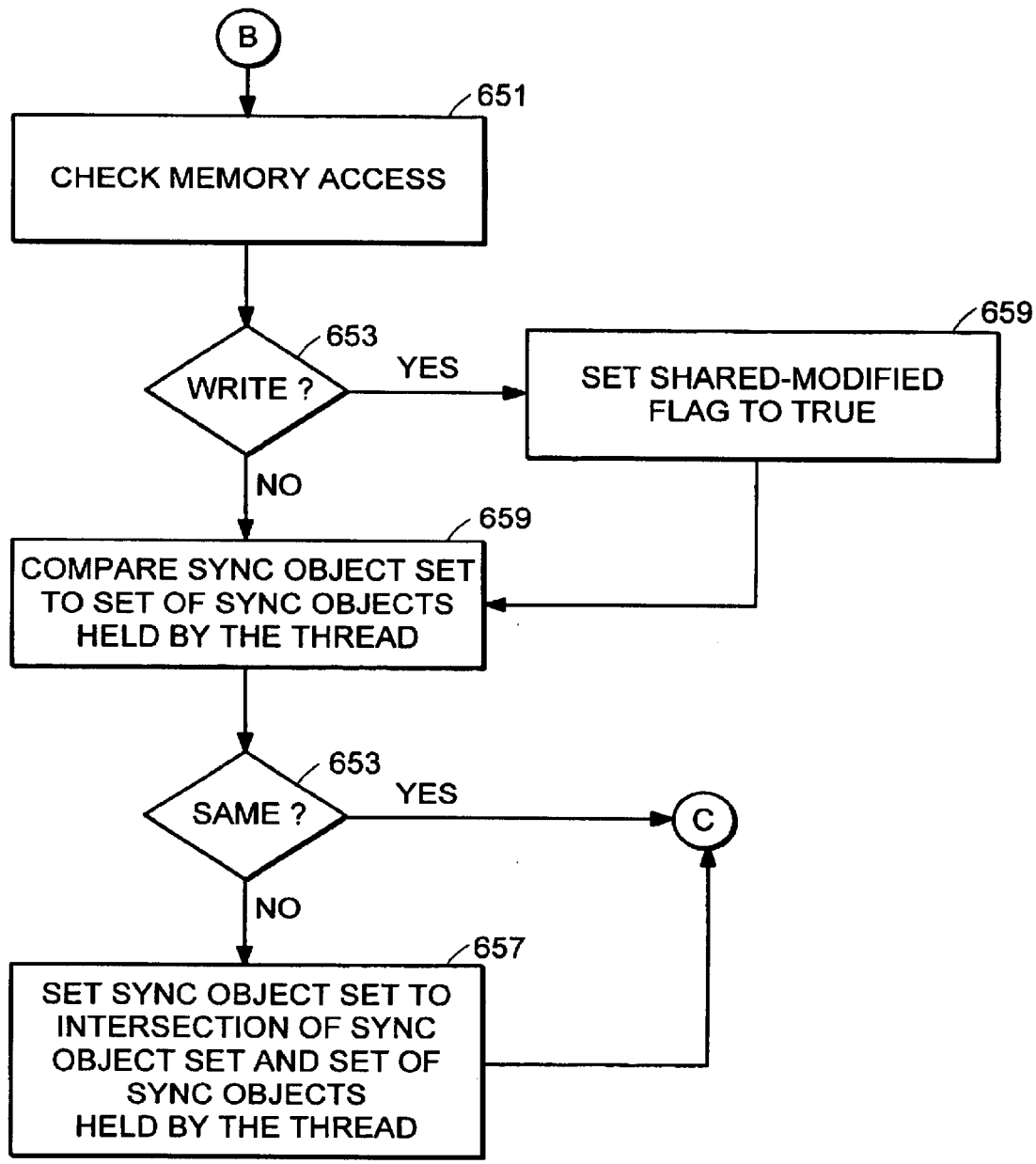

Continuing with FIG. 7C, the current memory access is checked at a step 651. If memory access is found to be a write at a step 653, the shared-modified flag of the memory location element is set to "true" at a step 659.

At a step 659, the sync object set of the memory location element is compared to the set of sync objects that are held by the current thread. If the sets of sync objects are determined not to be the same at a step 653, the sync object set of the memory location element is set equal to the intersection of the sync object set of the memory location element and the set of sync objects that is held by the current thread at a step 657. This process is also called lock set refinement.

As an example, if the sync objects may be represented by numbers, the following shows the calculation of the new sync object set of the memory location element:

| sync object set | held sync objects | new sync object set |
| --- | --- | --- |
| {1,3,5} | {1,5,7} | {1,5} |
| {2,3,4,5} | {2,3,5} | {2,3,5} |
| {4,5} | {1,2,6,7,8} | {} |

Thus, the sync object set of the memory location element includes the sync objects that are held by every thread that accesses the memory location. Each of these sync objects is potentially synchronizing access to the memory location. However, if the sync object set becomes equal to the empty set (as in the last example in the table), unsynchronized accesses to the memory are and have been possible.

In a preferred embodiment, each set of the sync objects is stored as a compressed 32-bit word. This allows the sets to be efficiently stored so that they do not occupy too much memory space.

Figure 7D:
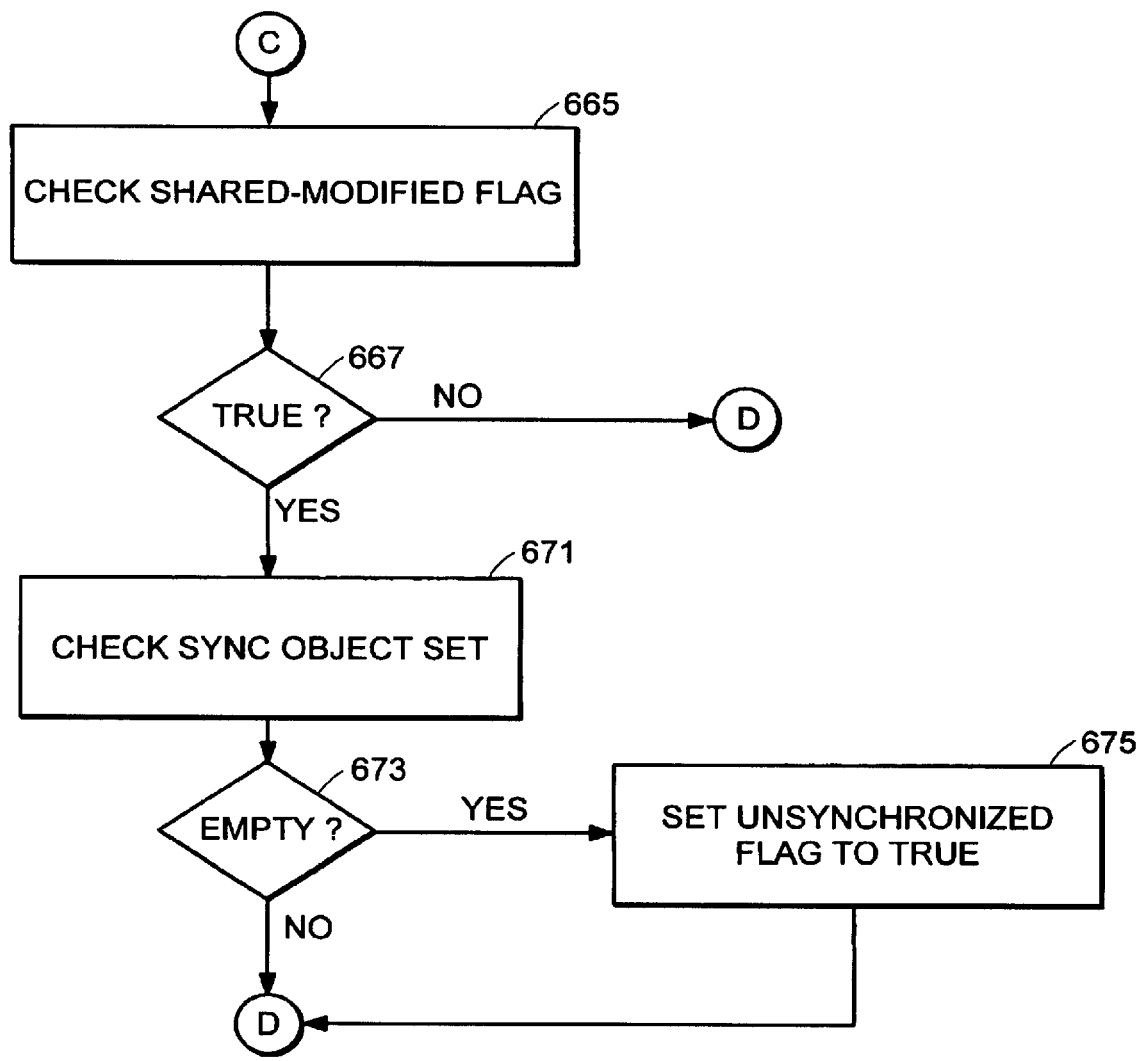
Figure 7E:
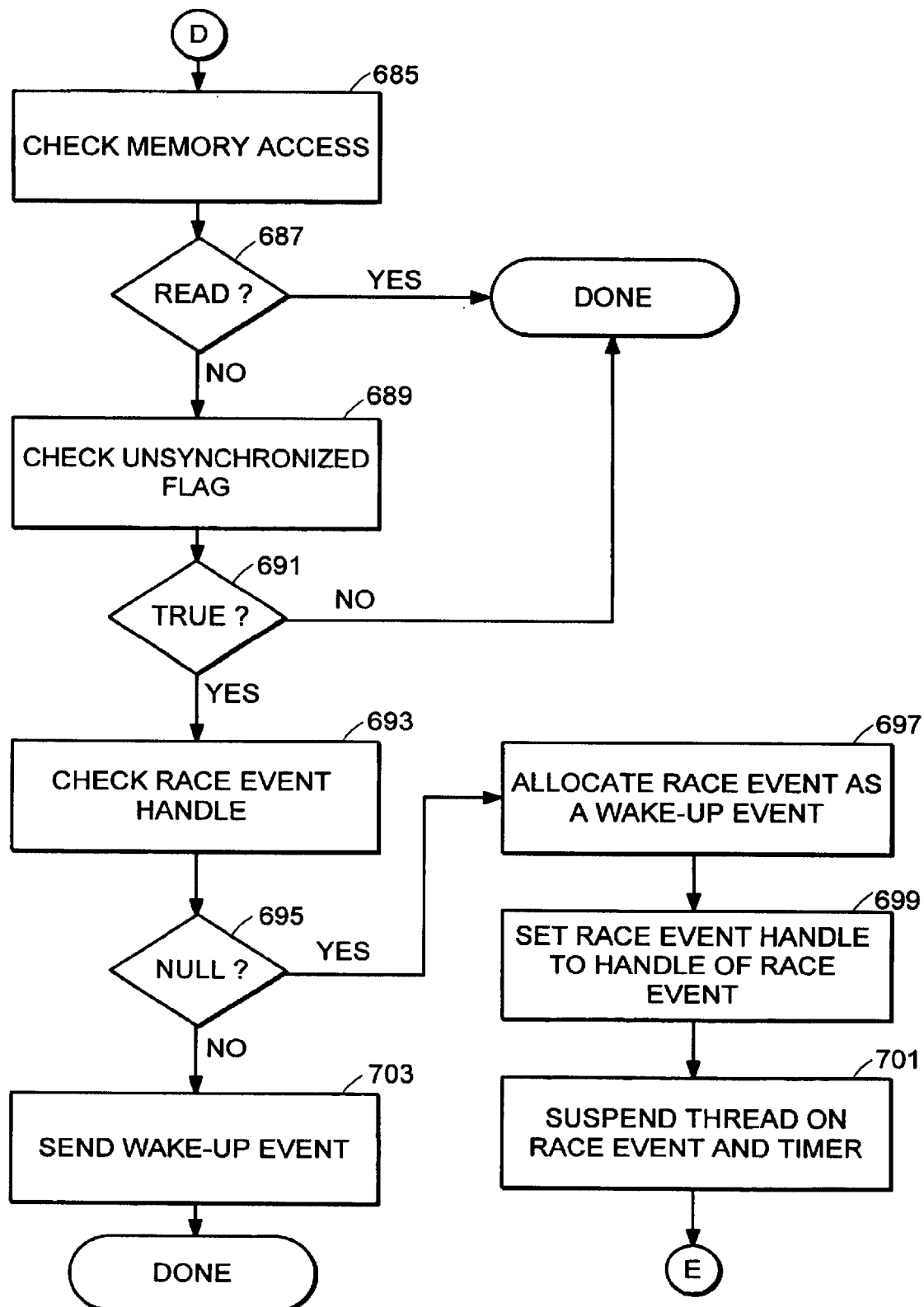

Continuing to FIG. 7D, the shared-modified flag is checked at a step 665. If the shared-modified flag is found to be "true" at a step 667, the sync object set of the memory location element is checked at a step 671. If the sync object set of the memory location element is found to be the empty set at a step 673, unsynchronized accesses to the memory location are possible. The unsynchronized flag of the memory location element is set to "true" at a step 675.

Continuing to FIG. E, the current memory access is checked at a step 685. If it is determined to be a read at a step 687, the thread is allowed to continue. Otherwise, if it is a write, unsynchronized flag of the memory location element is checked at a step 689. If the unsynchronized flag is found to be "true" indicating that unsynchronized access to the memory location is possible at a step 691, the race event handle in the memory location element is checked at a step 693. The race event handle is the handle for an event that can be used to awaken a thread that is suspended after performing a write to an unsynchronized memory location.

If the race event handle is determined to be "null" at a step 695, meaning that a previous thread that was going to write to this location is not suspended, a race event is allocated as a wake-up event at a step 697. Operating systems typically have a mechanism for requesting an event handle that can be utilized between threads. An event is requested and the handle will be utilized to awaken this thread after it is suspended.

At a step 699, the race event handle in the memory location element is set to the allocated handle. The thread is then suspended on the race event and a timer at a step 701. The current thread is suspended and will be awaken if the race event message is received, thereby awakening the thread, or if a predetermined amount of time expires, which also sends a message to the thread to awaken. Thus, the thread can be awakened in two different ways. The execution flow of the thread after it awakens will be described in reference to FIG. 7F, but it may be beneficial to show how it can be awakened by another thread.

A subsequent thread can determine that the race event handle is not "null" at step 695. This means that a previous thread that attempted to write to this memory location is suspended. The current thread, i.e., the one that is not suspended, sends the wake-up event utilizing the race event handle in the memory location element at a step 703. The current thread will then continue to attempt to write to the memory location, potentially at the same time as the newly awakened thread. Thus, a latent race condition has been caused.

Figure 7F:
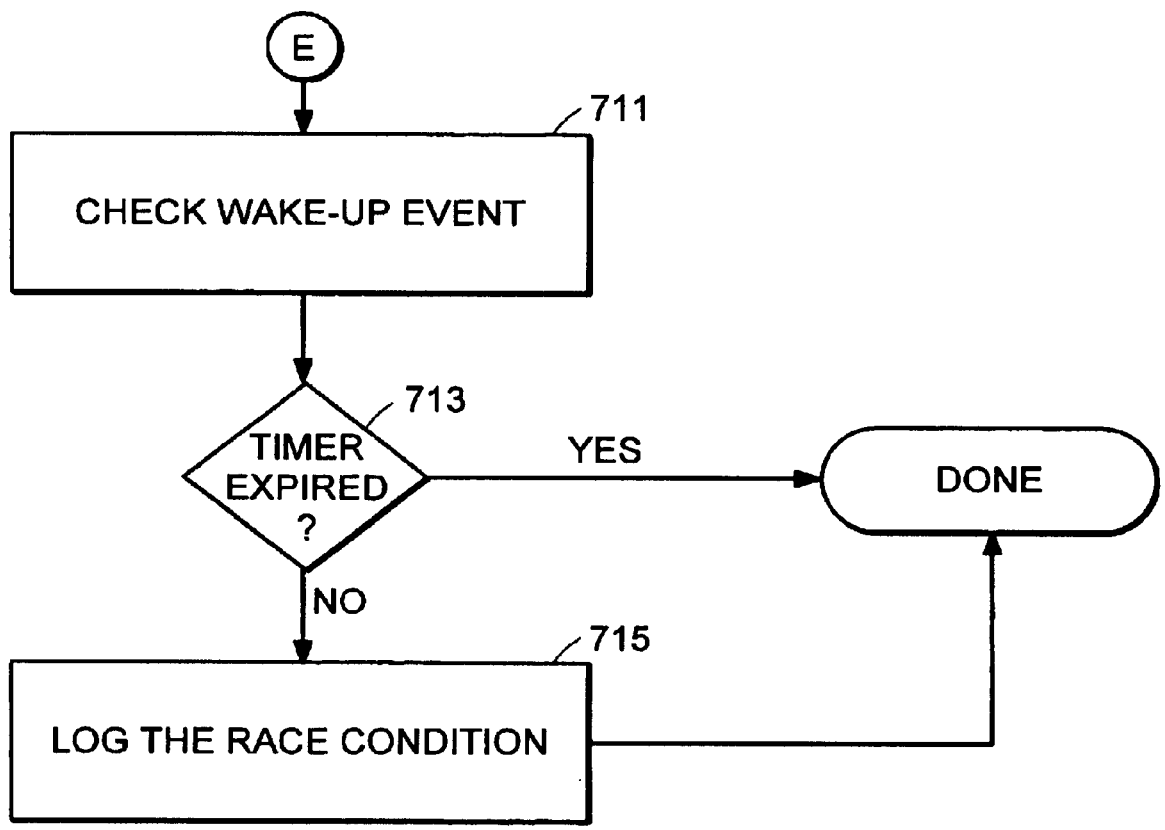

FIG. 7F shows a process a newly awakened thread can perform. At a step 711, the wake-up event is checked. If the wake-up event is determined to be that the timer expired at a step 713, the thread continues execution. This means that although the thread was suspended and a race condition was possible, it diD not occur during the predetermined time of the timer. The time can be lengthened to create a greater chance of causing a race condition.

If the wake-up event is determined to be the timer expiring, the thread was awakened by another thread that was writing to the same memory location and a race condition has occurred. At a step 715, the race condition is logged for the user. The mechanisms for suspending threads, allocating and sending events, setting timers, and awakening threads are typically dependent on the operating system that is being utilized.

Figure 9:
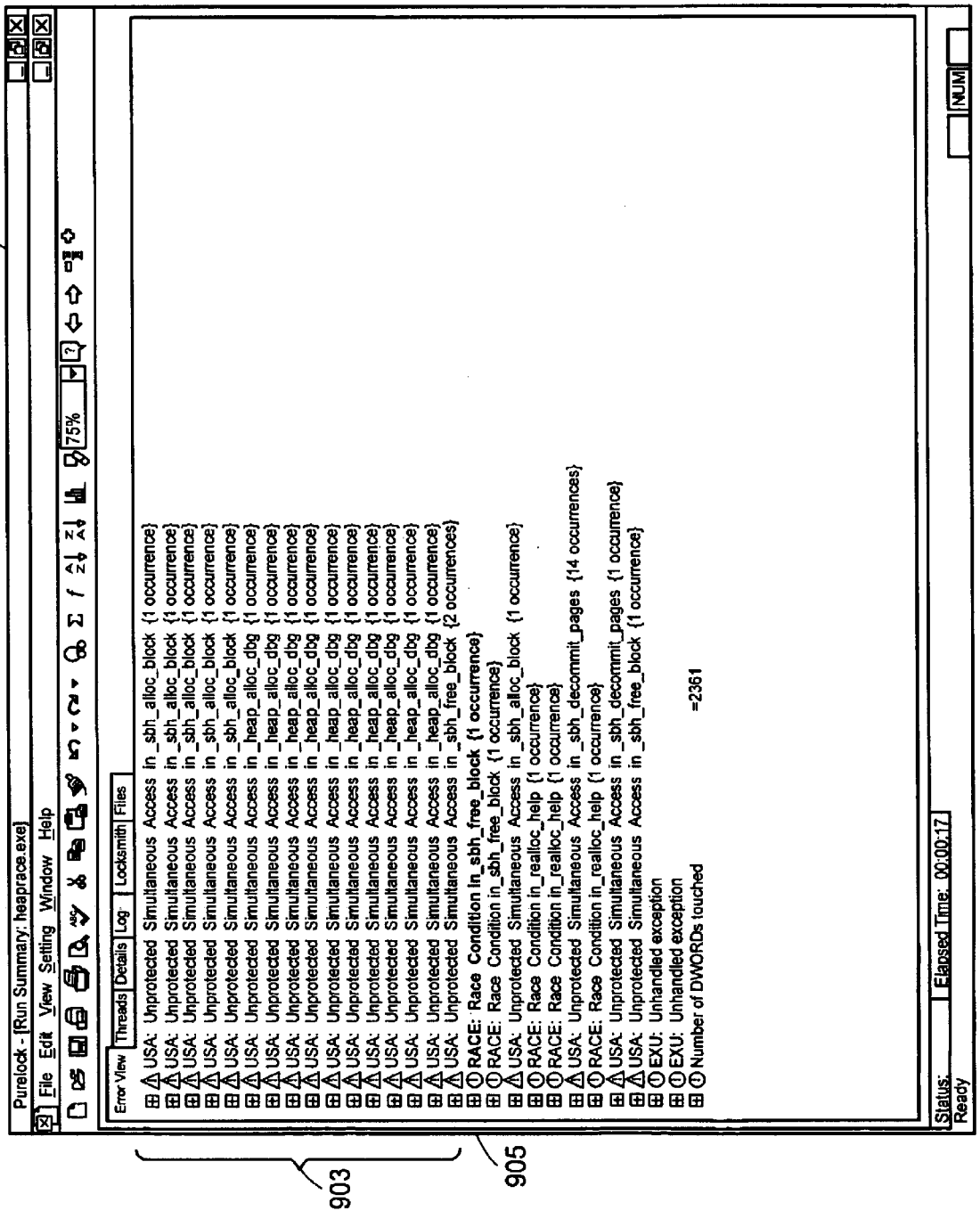
FIG. 9 illustrates a screen display of a program that identifies unsynchronized accesses to a memory location.

The unsynchronized accesses to a memory location can be logged any number of ways including displaying on the screen for a user to analyze. FIG. 9 illustrates a screen display of a program that identifies unsynchronized accesses to a memory location. A screen display 901, includes a listing of unsynchronized accesses and race conditions.

Multiple unsynchronized access messages 903 are shown in FIG. 9. These messages are generated whenever it is determined that unsynchronized accesses to a memory location are possible. In a preferred embodiment, the messages are generated when the unsynchronized flag is set to "true" (see step 675 of FIG. 7D). These can be thought to as warnings since they indicate that there is a potential race condition.

Figure 10:
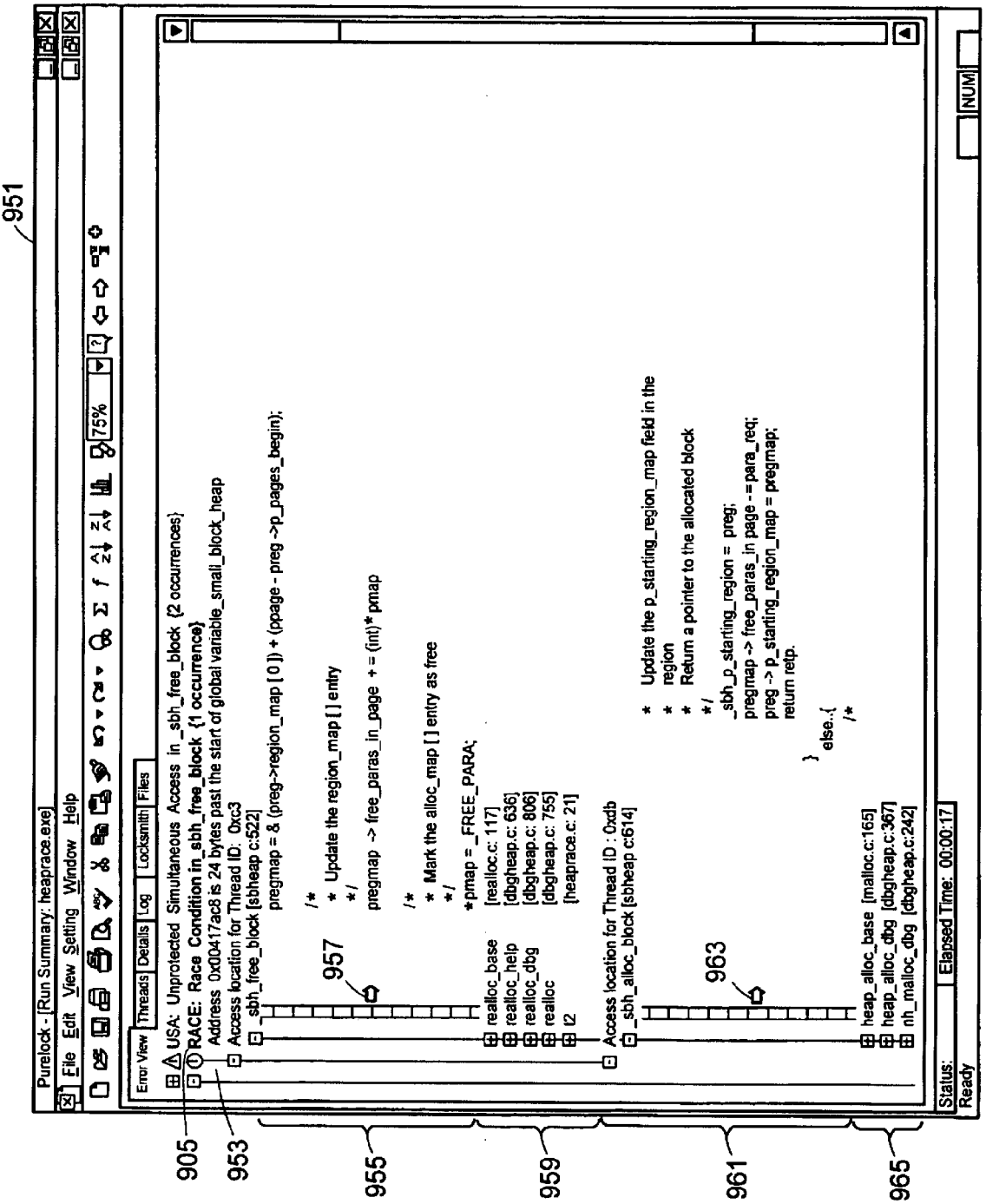
FIG. 10 illustrates more details of a race condition for a memory location in the screen display of FIG. 9.

A race condition message 905 is also shown (other race conditions are shown but details of race condition 905 are shown in FIG. 10). The message for a race condition can be thought of as an error because the race condition occurred. The race condition can be generated at step 715 of FIG. F. The plus sign next to race condition message 905 can be activated to show more details of the race condition.

FIG. 10 illustrates more details of a race condition for a memory location in the screen display of FIG. 9. An address 953 of the memory location where the race condition occurred is displayed. Additionally, information is provided about the two (or more) threads that wrote data to the memory location and caused the race condition.

A source code section 955 shows the source code that the first thread was executing when the race condition occurred. An arrow 957 specifies the instruction that caused the race condition. Additionally, all or a portion of a call chain 959 is shown which illustrates the functions that were called to lead to the race condition.

In a similar manner, a source code section 961 shows the source code that the second thread was executing when the race condition occurred and an arrow 963 specifies the instruction that caused the race condition. Additionally, all or a portion of a call chain 965 is shown which illustrates the functions that were called to lead the race condition. As shown source code sections 957 and 963 are different, meaning that the thread were executing different instructions. Race conditions also can occur when threads are executing the same instructions.

Screen display 951 allows a user to analyze the execution of a multi-threaded program to more easily determine how the race condition occurred. The source code was made available by compiling the source code with options that allow a preferred embodiment to have the source code available during execution. Although the source code makes the analysis easier, it is not required for the invention.

With the invention, latent unsynchronized accesses may be forced to occur which can allow a user to more easily analyze details on which caused the unsynchronized accesses. Furthermore, the invention allows the user to attempt to reproduce them after the problem has been reported fixed.

While the above is a complete description of preferred embodiments of the invention, various alternatives, modifications, and equivalents can be used. It should be evident that the invention is equally applicable by making appropriate modifications to the embodiments described above. For example, the invention is not memory location but can be advantageously applied to other resources as well including regions of memory, hardware components, and peripheral devices. Therefore, the above description should not be taken as limiting the scope of the invention that is defined by the metes and bounds of the appended claims along with their full scope of equivalents.

What is claimed is:

1. A computer implemented method of analyzing multi-threaded programs, comprising:
    determining that a resource of interest is susceptible to unsynchronized accesses by a plurality of threads, such that there can be latent unsynchronized accesses to the resource;

causing occurrence of a latent unsynchronized access to the resource by:
(a) receiving a request from a first thread to access the resource;
(b) suspending the first thread for requesting to access the resource; and
(c) while the first thread is suspended, receiving a request from a second thread to access the resource, and from said caused latent unsynchronized access, detecting unsynchronized accesses to the resource.

2. The method of claim 1, wherein the requests of the first and second threads is to write data to the resource.

3. The method of claim 1, further comprising awakening the first thread.

4. The method of claim 1, further comprising logging for a user that the first and second thread performed unsynchronized accesses to the resource.

5. The method of claim 1, wherein the first thread is suspended for a predetermined time, meaning that the first thread awakens after the predetermined time expires.

6. The method of claim 5, wherein the first thread is also suspended on an event, meaning that the event awakens the first thread.

7. The method of claim 6, wherein the second thread sends the event that awakens the first thread.

8. The method of claim 1, wherein the resource is a memory location, region of memory, hardware component, or peripheral device.

9. A computer program product executed by computer for analyzing multi-threaded programs, comprising:
computing code that determines that a resource of interest is susceptible to unsynchronized accesses by a plurality of threads, such that there can be latent unsynchronized accesses to the resource;
computer code that causes occurrence and detection of a latent unsynchronized access to the resource by:
(a) receiving a request from a first thread to access the resource;
(b) suspending the first thread for requesting to access the resource; and
(c) while the first thread is suspended, receiving a request from a second thread to access the resource; and
a computer readable medium that stores the computer codes.

10. The computer program product of claim 9, wherein the computer readable medium is selected from the group consisting of CD-ROM, floppy disk, tape, flash memory, system memory, and hard drive.

11. A computer implemented method of analyzing multi-threading programs, comprising:
determining susceptibility of a memory location to unsynchronized accesses by a plurality of threads, such that there can be latent unsynchronized accesses to the memory location;
causing occurrence of a latent unsynchronized access to the memory location and detecting said latent unsynchronized access by:
(a) receiving a request from a first thread to write data to the memory location;
(b) suspending the first thread for requesting to write data to the memory location; and
(c) while the first thread is suspended, receiving a request from a second thread to write data to the memory location.

12. The method of claim 11, further comprising awakening the first thread.

13. The method of claim 11, further comprising logging for a user that the first and second thread performed unsynchronized writes to the memory location.

14. The method of claim 11, wherein the first thread is suspended for a predetermined time, meaning that the first thread awakens after the predetermined time expires.

15. The method of claim 14, wherein the first thread is also suspended on an event, meaning that the event awakens the first thread.

16. The method of claim 15, wherein the second thread sends the event that awakens the first thread.

17. A computer program product executed by computer for analyzing multi-threaded programs, comprising:
computer code that determines susceptibility of a memory location to unsynchronized accesses by a plurality of threads, such that there can be latent unsynchronized accesses to the memory location;
computer code that causes and detects occurrence of a latent unsynchronized access to the memory location by:
(a) receiving a request from a first thread to write data to the memory location;
(b) suspending the first thread for requesting to write data to the memory location; and
(c) while the first thread is suspended, receiving a request from a second thread to write data to the memory location; and
a computer readable medium that stores the computer codes.

18. The computer program product of claim 17, wherein the computer readable medium is selected from the group consisting of CD-ROM, floppy disk, tape, flash memory, system memory, and hard drive.

19. A computer implemented method of analyzing multi-threaded programs, comprising:
determining that latent unsynchronized accesses to a memory location can be performed by a plurality of threads;
causing occurrence of a latent unsynchronized access to the memory location by:
(a) receiving a request from a first thread to write data to the memory location;
(b) suspending the first thread for requesting to write data to the memory location; and
(c) while the first thread is suspended, receiving a request from a second thread to write data to the memory location; and
(d) awakening the first thread; and
logging for a user that the first and second thread performed unsynchronized writes to the memory location.

20. The method of claim 19, wherein the first thread is suspended for a predetermined time, meaning that the first thread awakens after the predetermined time expires.

21. The method of claim 20, wherein the first thread is also suspended on an event, meaning that the event awakens the first thread.

22. The method of claim 21, wherein the second thread sends the event that awakens the first thread.

23. A computer program product executed by computer for analyzing multi-threaded programs, comprising:
computer code that determines the latent unsynchronized accesses to a memory location can be performed by a plurality of threads;
computer code that causes occurrence of a latent unsynchronized access to the memory location by:

(a) receiving a request from a first thread to write data to the memory location;
(b) suspending the first thread for requesting to write data to the memory location;
(c) while the first thread is suspended, receiving a request from a second thread to write data to the memory location; and
(d) awakening the first thread; and computer code that logs for a user that the first and second thread performed unsynchronized writes to the memory location; and a computer readable medium that stores the computer codes.

24. The computer program product of claim 23, wherein the computer readable medium is selected from the group consisting of CD-ROM, floppy disk, tape, flash memory, system memory, and hard drive.

25. A computer implemented method of analyzing multi-threaded programs, comprising:

modifying an existing multi-threaded program to include computer code that determines the latent unsynchronized accesses to a memory location can be performed by a plurality of threads;

modifying the existing multi-threaded program to include computer code that causes occurrence of a latent unsynchronized access to the memory location by suspending a first thread for requesting to write data to the memory location, wherein a second thread writes data to the memory location; and modifying the existing multi-threaded program to include computer code that logs for a user that the first and second thread performed unsynchronized writes to the memory location when a second thread writes data to the memory location.

26. The method of claim 25, wherein the first thread is suspended for a predetermined time, meaning that the first thread awakens after the predetermined time expires.

27. The method of claim 26, wherein the first thread is also suspended on an event, meaning that the event awakens the first thread.

28. The method of claim 27, wherein the second thread sends the event that awakens the first thread.

29. A computer program product executed by computer for analyzing multi-threaded programs, comprising:

computer code that modifies an existing multi-threaded program to include computer code that determines that latent unsynchronized accesses to a memory location can be performed by a plurality of threads;

computer code that modifies the existing multi-threaded program to include computer code that causes occurrence of a latent unsynchronized access to the memory location by suspending a first thread for requesting to write data to the memory location, wherein a second thread writes data to the memory location;

computer code that modifies the existing multi-threaded program to include computer code that logs for a user that the first and second thread performed unsynchronized writes to the memory location when a second thread writes data to the memory location; and a computer readable medium that stores the computer code.

30. The computer program product of claim 29, wherein the computer readable medium is selected from the group consisting of CD-ROM, floppy disk, tape, flash memory, system memory, and hard drive.

* * * * *